(12) United States Patent
Ricart et al.

(10) Patent No.: US 11,726,940 B2
(45) Date of Patent: Aug. 15, 2023

(54) SYSTEM FOR COMMUNICATING WITH REMOVABLE COMPONENTS

(71) Applicant: Lear Corporation, Southfield, MI (US)

(72) Inventors: Raúl Ricart, Valls (ES); Antoni Ferré Fàbregas, Valls (ES); Jeffrey A. Jones, Ann Arbor, MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 17/395,808

(22) Filed: Aug. 6, 2021

(65) Prior Publication Data

US 2023/0039726 A1 Feb. 9, 2023

(51) Int. Cl.
| | |
|---|---|
| *G06F 13/00* | (2006.01) |
| *G06F 13/40* | (2006.01) |
| *B60R 11/00* | (2006.01) |
| *B60R 16/03* | (2006.01) |
| *H04L 67/12* | (2022.01) |

(52) U.S. Cl.
CPC .......... *G06F 13/4068* (2013.01); *B60R 11/00* (2013.01); *B60R 16/03* (2013.01); *H04L 67/12* (2013.01); *B60R 2011/005* (2013.01); *B60R 2011/0029* (2013.01); *B60R 2011/0078* (2013.01); *B60R 2011/0084* (2013.01)

(58) Field of Classification Search
CPC ..... G06F 13/4068; B60R 11/00; B60R 16/03; B60R 2011/0029; B60R 2011/005; B60R 2011/0078; B60R 2011/0084; H04L 67/12
See application file for complete search history.

(56) References Cited

U.S. PATENT DOCUMENTS

| | | | |
|---|---|---|---|
| 7,111,100 B2 | 9/2006 | Ellerbrock | |
| 7,328,286 B2 | 2/2008 | Vinnemann | |
| 8,010,714 B2 | 8/2011 | Simon | |
| 8,695,872 B2* | 4/2014 | Braunstein | G07F 9/026 235/379 |
| 8,718,797 B1 | 5/2014 | Addepalli et al. | |
| 9,305,411 B2 | 4/2016 | Ricci | |
| 9,422,058 B2 | 8/2016 | Fischer et al. | |
| 10,239,621 B2 | 3/2019 | Hoch et al. | |
| 2003/0098661 A1 | 5/2003 | Stewart-Smith | |
| 2009/0070861 A1* | 3/2009 | Jain | G06Q 20/341 726/5 |
| 2021/0153231 A1* | 5/2021 | Yeo | H04W 72/20 |
| 2022/0303982 A1* | 9/2022 | Hosseini | H04W 28/26 |

* cited by examiner

*Primary Examiner* — Henry Tsai
*Assistant Examiner* — Kim T Huynh
(74) *Attorney, Agent, or Firm* — McGarry Bair PC

(57) ABSTRACT

A system for communicating with removable components may include an electronic controller and a removable component having an identifier and configured to communicate with the electronic controller. The removable component may be configured to transmit the identifier to the electronic controller via a first communication channel. The electronic controller may be configured to transmit a confirmation to the removable component after receipt of the identifier. The removable component may be configured to transmit information to the electronic controller via at least one of the first communication channel and/or a second communication channel, after receipt of the confirmation.

20 Claims, 8 Drawing Sheets

SYSTEM FOR COMMUNICATING WITH REMOVABLE COMPONENTS

TECHNICAL FIELD

The present disclosure generally relates to systems for communicating with removable components, which may include vehicles and removable components for vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some systems for communicating with removable components may not provide sufficient functionality. Some systems may not be configured for use with removable components whose locations/configurations may continuously change.

There is a desire for solutions/options that minimize or eliminate one or more challenges or shortcomings of systems. The foregoing discussion is intended only to illustrate examples of the present field and is not a disavowal of scope.

SUMMARY

In embodiments, a system for communicating with removable components may include an electronic controller and/or a removable component having an identifier and configured to communicate with the electronic controller. The removable component may be configured to transmit the identifier to the electronic controller via a first communication channel. The electronic controller may be configured to transmit a confirmation to the removable component after receipt of the identifier. The removable component may be configured to transmit information to the electronic controller via at least one of the first communication channel and/or a second communication channel, after receipt of the confirmation.

With embodiments, a method of operating a system for communicating with removable components may include transmitting, by the removable component, the identifier to the electronic controller via the first communication channel, transmitting, by the electronic controller, the confirmation to the removable component, after receipt of the identifier, and/or transmitting, by the removable component, the information via the second communication channel, after receipt of the confirmation.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
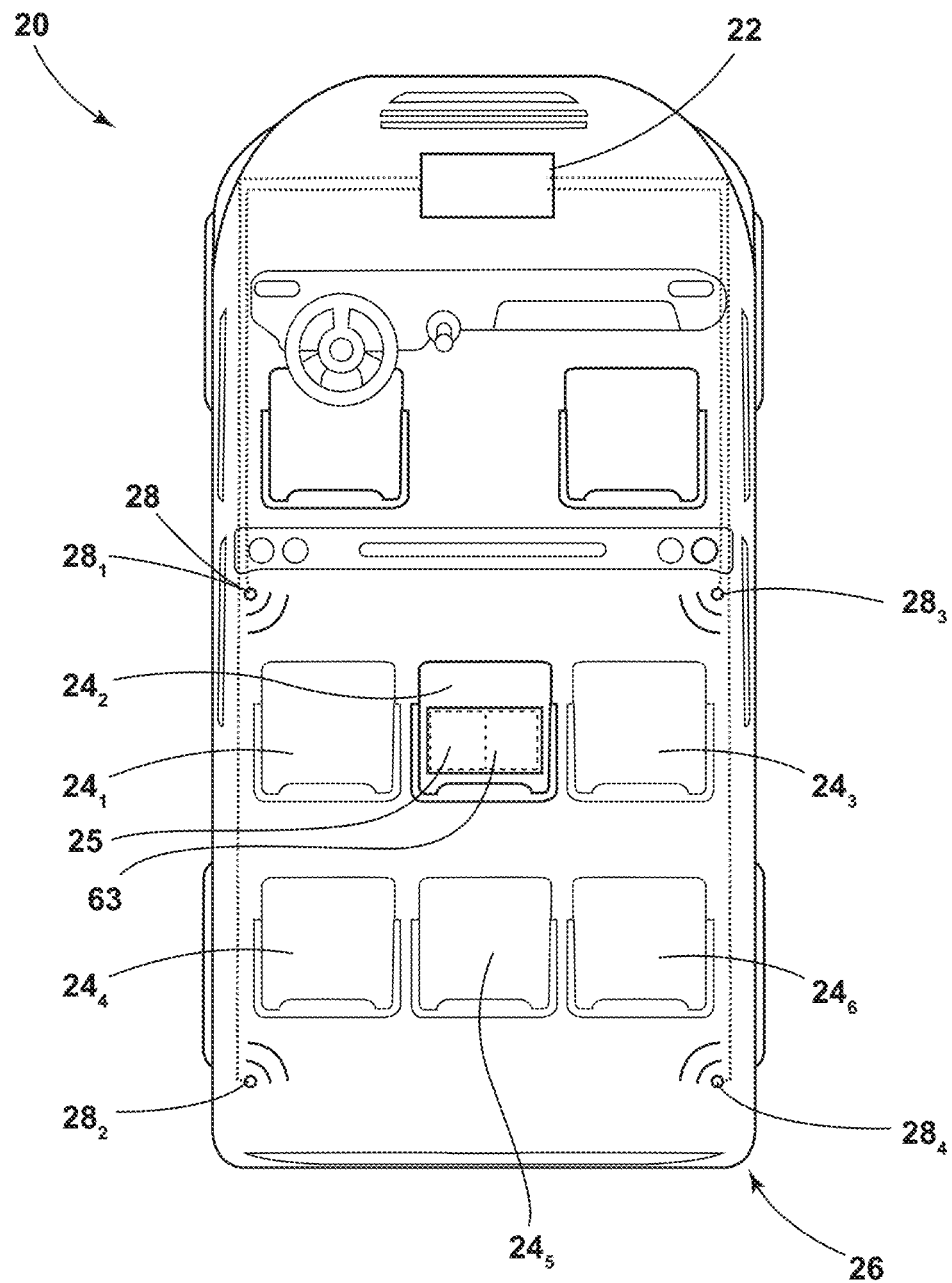
FIG. 1 is a top view generally illustrating an embodiment of a system for communicating with removable components according to teachings of the present disclosure.

In embodiments, such as generally illustrated in FIG. 1, a system 20 may include an electronic controller 22 and/or one or more removable components 24. In some instances, the system 20 may include and/or be disposed at least partially within a vehicle 26. For example, the one or more removable components 24 (e.g., a first removable component $24_1$, a second removable component $24_2$, a third removable component $24_3$, a fourth removable component $24_4$, a fifth removable component $24_5$, and/or a sixth removable component $24_6$) may be disposed at different locations within the vehicle 26. The system 20 may, for example and without limitation, be configured for facilitating communication between the electronic controller 22 and the one or more removable components 24.

With embodiments, an electronic controller 22 may include an electronic control unit (ECU). In some instances, the electronic controller 22 may control one or more electrical systems and/or subsystems in the vehicle 26, in addition to the responsibilities attributed to the electronic controller 22 in this specification. The electronic controller 22 may, for instance, include a body control module, a chassis control module, and/or an engine control module With embodiments, an electronic controller 22 may be connected (e.g., electrically) to one or more transceivers 28, such as a first transceiver $28_1$, a second transceiver $28_2$, a third transceiver $28_3$, and/or a fourth transceiver $28_4$ (see, e.g., FIG. 1). The one or more transceivers 28 may be configured to communicate with the electronic controller 22. In some instances, the one or more transceivers 28 may be configured to transmit information from the electronic controller 22 to one or more removable components 24, and/or may be configured to receive and transmit information from the one or more removable components 24 to the electronic controller 22. In some examples, the one or more transceivers 28 may be disposed at various locations throughout the vehicle 26.

In embodiments, a vehicle 26 may include one or more of a variety of configurations. For example and without limitation, a vehicle 26 may include a land vehicle, a passenger car, a van, a sport utility vehicle (SUV), a crossover, a truck (e.g., a pickup truck, a commercial truck, etc.), a bus, a watercraft, an aircraft (e.g., a plane, a helicopter, etc.), and/or a combination thereof (e.g., a vehicle for land and water, a vehicle for air and water, etc.), among others. With embodiments, such as generally illustrated in FIG. 2, a vehicle 26 may include one or more mounting surfaces 30 (e.g., a vehicle interior, a vehicle exterior, etc.) that may be configured for selective connection with one or more removable components 24.

Figure 2:
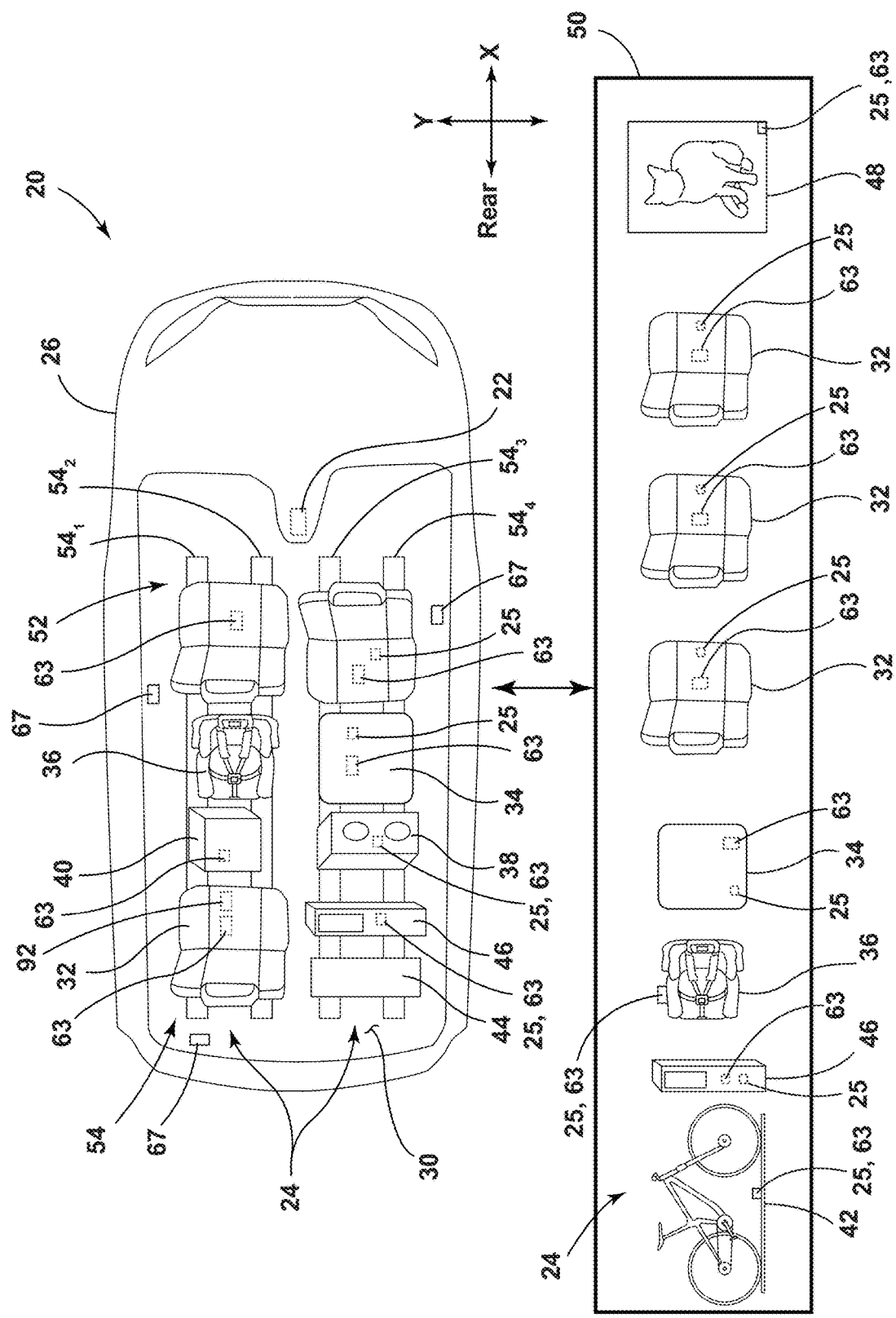
FIG. 2 is a representation generally illustrating embodiments of a vehicle with a plurality of components and a storage facility with a plurality of components according to teachings of the present disclosure.

With embodiments, such as generally illustrated in FIG. 2, removable components 24 may, for example and without limitation, include vehicle seats 32, tables 34, child seats 36 (e.g., car seats for children), power outlets 38 (e.g., AC outlets and/or DC outlets), appliances 40 (e.g., refrigerators, freezers, coffee makers, etc.), mounting racks 42 (e.g., bike racks, kayak racks, ski racks, etc.), consoles 44, lights 46, and/or pet crates 48, among others. Removable components 24 may be configured for selective connection with, movement within, movement along and relative to, and/or removal from the vehicle interior and/or exterior. Removable components 24 may include electrical components (e.g., components with electrical loads/elements) and/or may include non-electrical components (e.g., without electrical loads/elements). Removable components 24 may, for example, be stored, at least temporarily, in a storage facility 50 (e.g., a warehouse, shed, etc.), such as when not connected or installed with a vehicle 26.

With embodiments, such as generally illustrated in FIGS. 2, 3, and 4A-4C, a vehicle 26 and/or a mounting surface 30 may include a track/rail assembly 52 that may be connected (e.g., fixed) to and/or in a mounting surface 30, such as in a vehicle 26. A track/rail assembly 52 may include one or more tracks 54, such as a first track $54_1$, a second track $54_2$, a third track $54_3$, a fourth track $54_4$, a fifth track $54_5$, and/or a sixth track $54_6$ that may extend substantially parallel to each other (e.g., in a longitudinal/X-direction), such as generally illustrated in FIG. 2. The tracks 54 may, for example, be spaced from each other, such as in a lateral direction of the vehicle 26 (e.g., a Y-direction). A track/rail assembly 52 may include other track/rail configurations. The one or more components 24 may, with some embodiments, be selectively/releasably connected to (e.g., mechanically and/or electrically), move (e.g., slide) along and relative to, and/or be removed from the mounting surface 30 via the track assembly 52, such as, in some examples, without additional or external tools (e.g., may be selectively secured to and removed in a Z-direction from the track assembly 52 in a plurality or positions/orientations along the track assembly 52).

Figure 3:
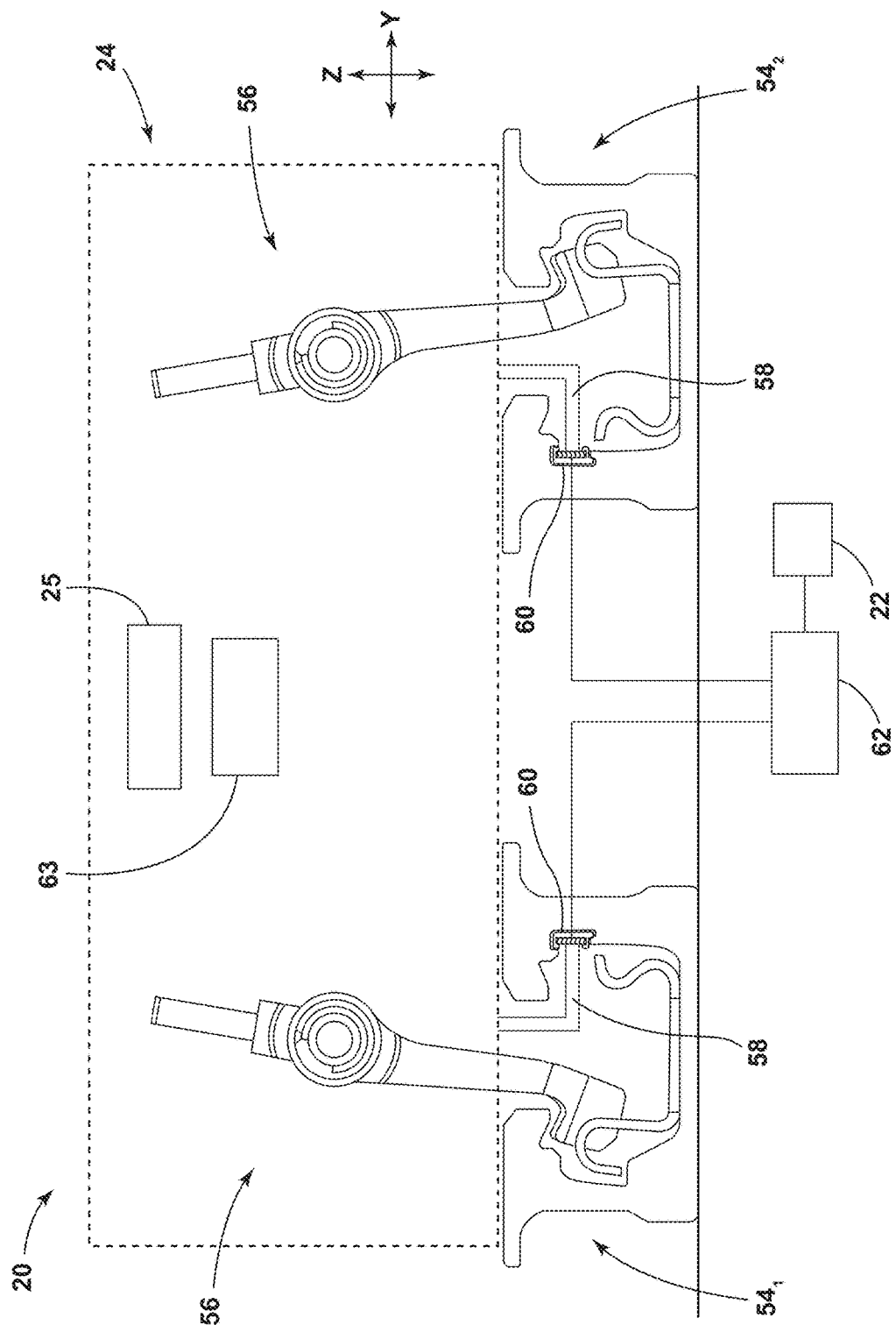
FIG. 3 is an end view of an embodiment of a track assembly of a vehicle and a removable component of a system according to teachings of the present disclosure.

With embodiments, a component 24 may, for example and without limitation, include one or more latches/anchors 56 that may be configured to selectively engage and/or contact the track assembly 52 to restrict or prevent movement of a component 24 in one or more directions (e.g., an X direction and/or a Z-direction of the track assembly 52), and/or one or more electrical contacts 58 that may be configured to selectively contact a conductor 60 of a track assembly 52, such as to provide power from a power source 62 (e.g., a vehicle battery) to the component 24 (see, e.g., FIG. 3). The one or more latches/anchors 56 and/or the one or more electrical contacts 58 may be actuated (e.g., rotated, translated, etc.) between engaged/connected positions and disengaged/disconnected positions in one or more of a variety of ways, such as mechanically (e.g., via a lever/slider/cable, manually, etc.) and/or electronically (e.g., via an electric actuator/motor). The one or more latches/anchors 56 and/or the one or more electrical contacts 58 may restrict insertion/removal of a component 24 from the track assembly 52 when in engaged/connected positions, and/or may not restrict insertion/removal of a component 24 when in disengaged/disconnected positions.

Figure 4C:
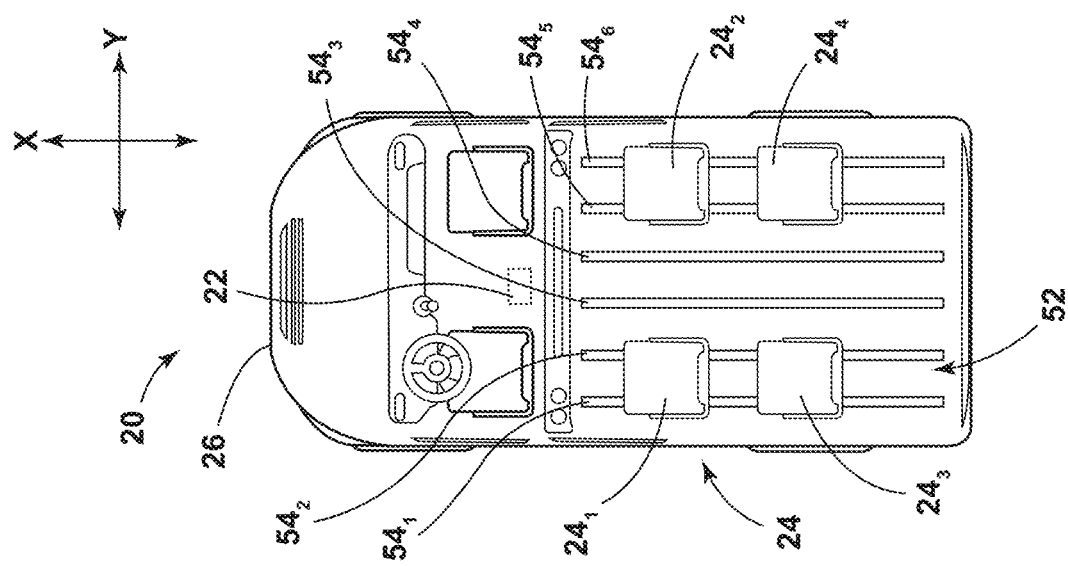
FIG. 4C is a top view generally illustrating an embodiment of a vehicle with a plurality of components according to teaching of the present disclosure.
Figure 4B:
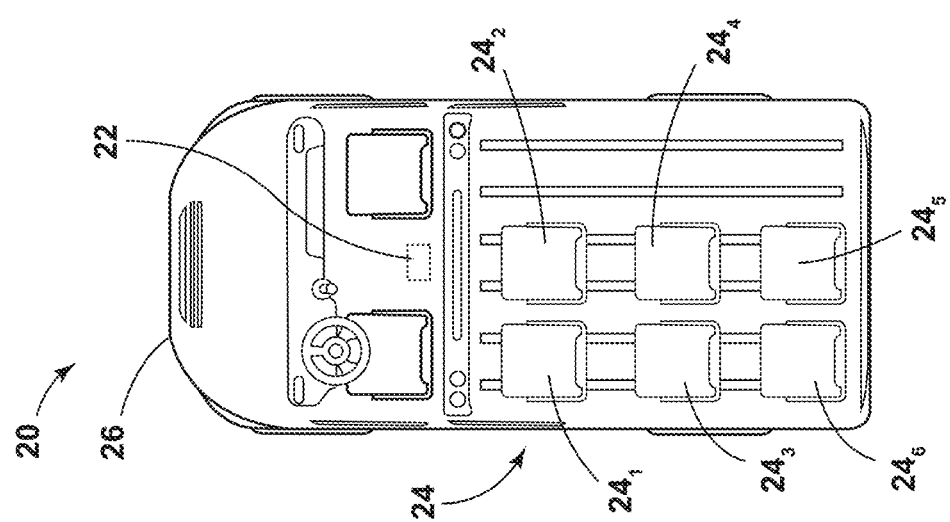
FIG. 4B is a top view generally illustrating an embodiment of a vehicle with a plurality of components according to teaching of the present disclosure.
Figure 4A:
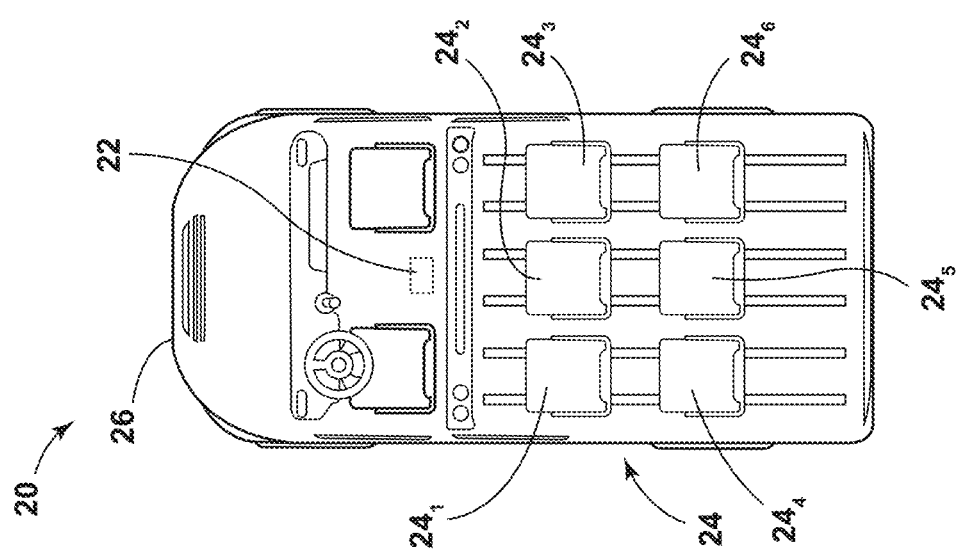
FIG. 4A is a top view generally illustrating an embodiment of a vehicle with a plurality of components according to teaching of the present disclosure.

With embodiments, such as generally illustrated in FIGS. 4A-4C, a system 20 may include a plurality of removable components 24, such as one or more seats 32. While example embodiments of systems 20 are depicted in connection with vehicles 26 including at least four vehicle seats 32 for the purposes of illustration, it will be appreciated that systems 20 are not limited to vehicle applications, systems 20 may include more or less than four vehicle seats 32 (e.g., in some cases, none), and may include other removable components 24.

In some embodiments that include seats 32 and a vehicle 26, seats 32 may be disposed at different locations and/or in different arrangements within the vehicle 26. The arrangement of the vehicle seats 32 may be customizable. In some examples, a user (e.g., a driver of a vehicle, an operator, a maintenance person or machine, etc.) may change the arrangement of and/or the number of removable components 24, which may include seats 32, before using one or more portions of a system 20, such as before using (e.g., driving/operating) the vehicle 26.

With embodiments, removable components 24, such as seats 32 or other components, may include respective component controllers 25 and/or may include sensors 63 (see, e.g., FIG. 2) that may be configured to provide information about, obtain information about, and/or determine, at least in part, a location of a removable component in the system 20 (e.g., within a vehicle 26 for vehicle applications, relative to a mounting surface 30, etc.). A sensor 63 may, for example, include one or a combination of a received signal strength indication (RSSI) sensor/antenna, an angle of arrival (AoA) sensor, a time-of-flight (TOF) sensor, a global positioning system (GPS) sensor/antenna, and/or a suitable component configured to obtain location information. In some example configurations, the respective component controllers 25 and/or one or more sensors 63 may be disposed within the removable components 24. In some instances, the respective sensor 63 may be configured to determine, at least in part, which tracks 54 of a track assembly 52 the removable component 24 is connected to, and/or the position of the removable component 24 along one or more tracks 54. Such location information may, for instance, be derived by radio-frequency triangulation among sensors 63 or may be via a GPS sensor. In some examples, a system 20 and/or vehicle 26 may include one or more safety devices 67 (e.g., airbags, pretensioners, etc.) and an electronic controller 22 and/or the respective sensors 63 may be configured to determine, at least in part, a position of a removable component 24 relative to one or more safety device 67, and the electronic controller 22 may control operation, at least in part, of the safety devices 67. A sensor 63 may additionally or alternatively include other sensors, such as occupancy sensors and/or electrical characteristic sensors (e.g., current, voltage, battery charge level, etc.), among others. With some configurations, a component controller 25 may be configured to communication with a sensor 63 and provide information obtained via a sensor 63 to the electronic controller 22. For example, a component controller 25 may include and/or be connected to a transceiver. Additionally or alternatively, a sensor 63 may be configured to communicate (e.g., directly) with the electronic controller 22.

Figure 5:
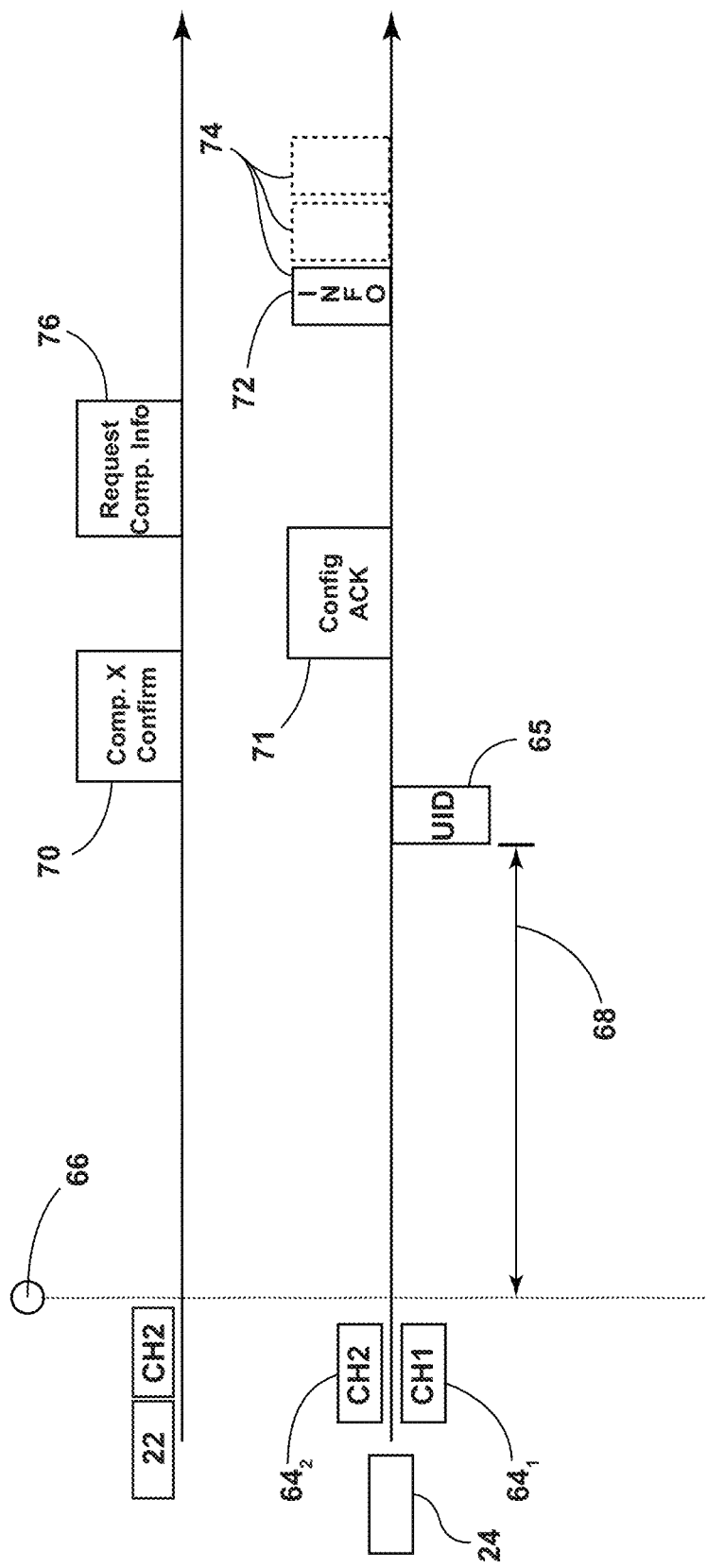
FIG. 5 is a diagram generally illustrating communications of an embodiment of a system for communicating with removable components according to teaching of the present disclosure.
Figure 6:
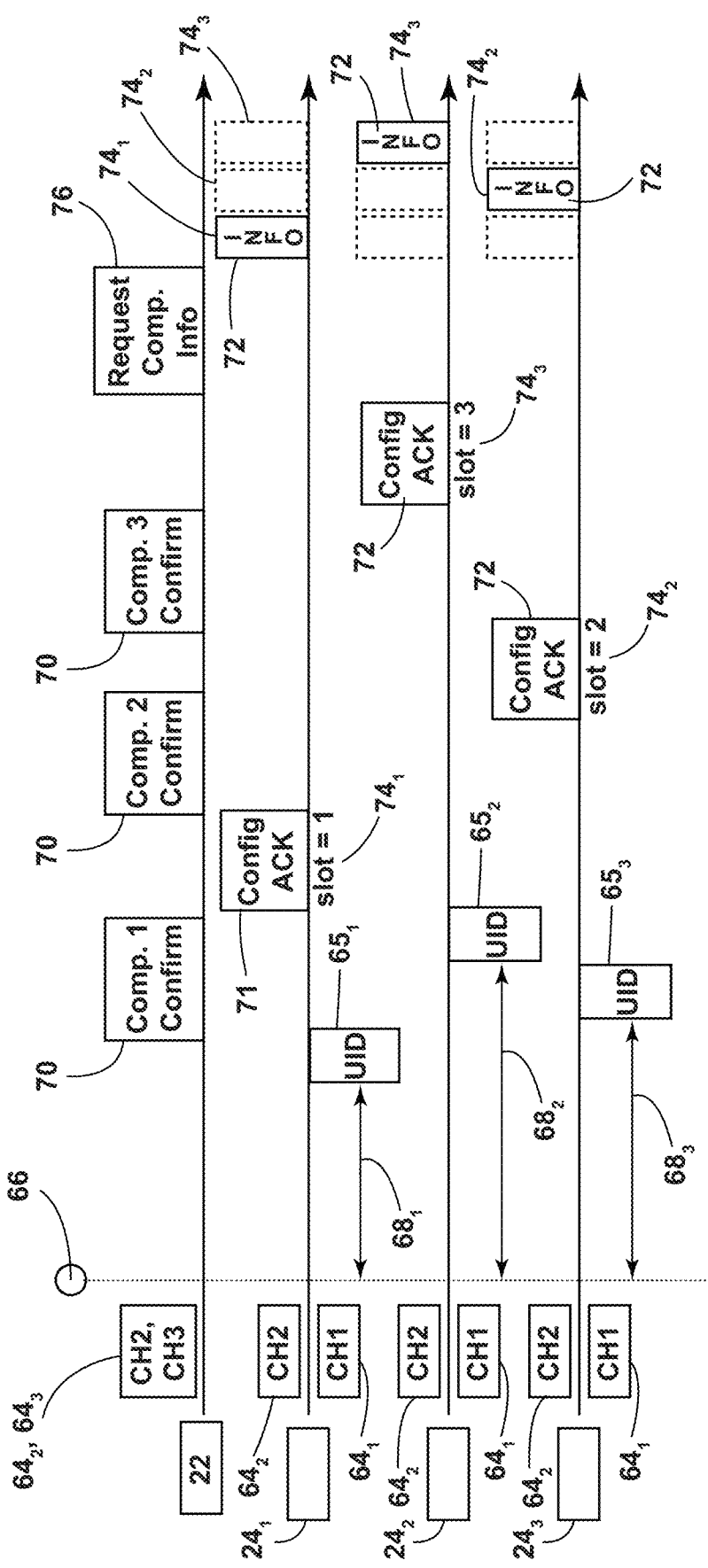
FIG. 6 is a diagram generally illustrating communications of an embodiment of a system for communicating with removable components according to teaching of the present disclosure.
Figure 7:
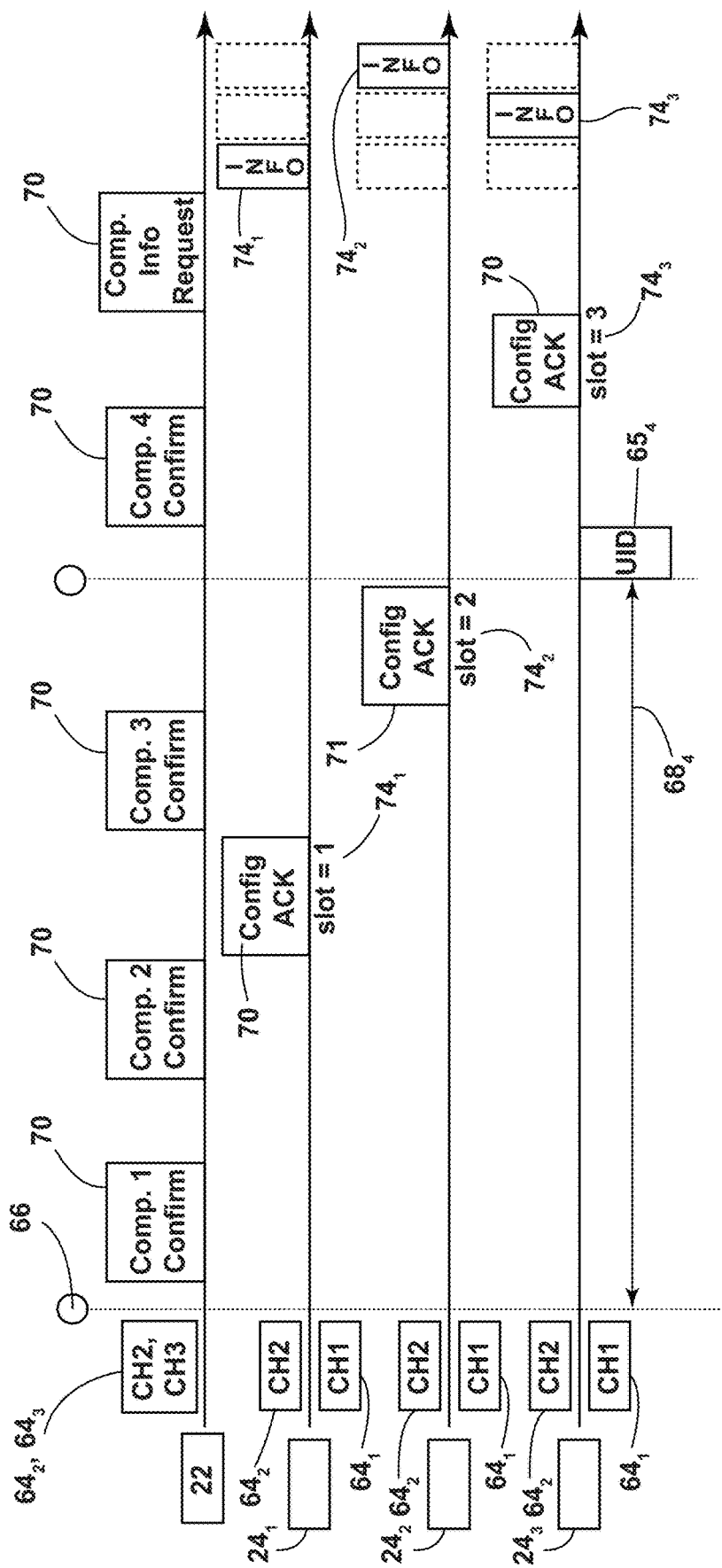
FIG. 7 is a diagram generally illustrating communications of an embodiment of a system for communicating with removable components according to teaching of the present disclosure.

In embodiments, such as generally illustrated in FIGS. 5-7, one or more removable components 24 may be configured to communicate, at least indirectly, with an electronic controller 22, such as via a wireless and/or a wired configuration. In some instances, one or more removable components 24 may be configured to communicate with an electronic controller 22 via one or more communication channels 64. In some examples, the one or more communication channels 64 may include a first communication channel $64_1$, a second communication channel $64_2$, a third communication channel $64_3$, and/or one or more additional communication channels. The first communication channel $64_1$ may be associated with a first communication medium, the second communication channel $64_2$ may be associated with a second communication medium, the third communication channel $64_3$ may be associated with a third communication medium, and/or the one or more additional communication channels may be associated with other communication mediums. The first communication channel $64_1$, the second communication channel $64_2$, and/or the third communication channel $64_3$ may or may not be of the same type (e.g., radio frequency, Bluetooth, WiFi, CAN, LAN, etc.).

In some instances, the first communication channel $64_1$, the second communication channel $64_2$, and/or the third communication channel $64_3$ may include radio frequency and/or Bluetooth channels. In some examples, the first communication channel $64_1$ may include a first frequency (e.g., ultra high frequency (UHF)), the second communication channel $64_2$ may include a second frequency (e.g., UHF), and/or the third communication channel $64_3$ may include a third frequency (e.g., a lower frequency). The first frequency, the second frequency, and/or the third frequency may be different (e.g., communications channels $64_1$, $64_2$, $64_3$ may be of the same type/medium but may have a different characteristic, such as frequency, amplitude, and/or duty cycle, among others). In some examples, the first communication channel $64_1$, the second communication channel $64_2$, and/or the third communication channel $64_3$ may be associated with an asynchronous communication protocol or a synchronous communication protocol (e.g., time-division multiple access (TDMA), frequency-division multiple access (FDMA), a combination of TDMA and FDMA, among others). In some example configurations, the first communication channel $64_1$ may be associated with an asynchronous communication protocol, and the second communication channel $64_2$, and/or the third communication channel $64_3$ may be associated with a synchronous communication protocol. An asynchronous communication protocol may, in some instances, be unruled. In some embodiments, a system 20 may include a plurality of synchronous channels (e.g., the second channel $64_2$, the third channel $64_3$, additional channels 64), such as to facilitate communication with a relatively large number of removable components 24. A system 20 may, at least in some embodiments, utilize a single asynchronous channel (e.g., the first channel $64_1$) even with a plurality of synchronous channels. In other embodiments, a plurality of asynchronous channels may be utilized.

With embodiments, such as generally illustrated in FIG. 5, a removable component 24 may include an identifier 65 (e.g., identifiers $65_1$-$65_4$) that may be unique, at least to some degree. The identifier may, for example and without limitation, include a number/numerical code, letters/an alphabetical code, an alphanumeric code, and/or a hexadecimal code, among other potential identifiers. In some instances, after a period of time 68 (e.g., periods $68_1$-$68_4$), the removable component 24 may be configured to transmit the identifier 65 to the electronic controller 22 via a first communication channel $64_1$. In some examples, an activation event 66 (e.g., for vehicle applications, a status/state change of a vehicle, a vehicle starting, a vehicle turning on, a vehicle powering up, etc.) may trigger the start of the period of time 68. In some instances, the activation event 66 may include a status/state change of a removable component 24 (e.g., a powering up of a track/rail assembly 52, a powering up of a removable component 24, folding/unfolding of a vehicle seat 32 in a vehicle application, connecting a removable component 24 to a track/rail assembly 52, a removable component 24 brought into proximity with a vehicle 26 and/or an electronic controller 22, among others).

In some examples, after the identifier 65 is received by the electronic controller 22, the electronic controller 22 may be configured to transmit a confirmation 70 to the removable component 24, such as via a second communication channel $64_2$ and/or the removable component 24 may transmit an acknowledgement, such as via the second communication channel $64_2$ and/or in response to the confirmation 70. In some instances, after the removable component 24 receives the confirmation 70 and/or transmits the acknowledgement 71 (e.g., via the second channel $64_2$), the electronic controller 22 may provide an information request 76, such as via the second communication channel $64_2$, and/or the removable component 24 may be configured to transmit information 72 (e.g., status information, location information, orientation information, of the removable component 24 relative to the mounting surface 30, etc.) to the electronic controller 22, such as via the first communication channel $64_1$, the second communication channel $64_2$, and/or the third communication channel $64_3$. In some instances, the information request 76 may include one or more instructions/commands, such as to activate one or more actuators 92 (e.g., position adjustment motors, safety devices 67, among others) of the removable component 24.

In embodiments, such as generally illustrated in FIG. 6, one or more removable components 24 may include a first removable component $24_1$ having a first identifier $65_1$, a second removable component $24_2$ having a second identifier $65_2$, and/or a third removable component $24_3$ having a third identifier $65_3$. After a first period of time $68_1$, the first removable component $24_1$ may be configured to transmit the first identifier $65_1$ to the electronic controller 22, such as via a first communication channel $64_1$. After a second period of time $68_2$, the second removable component $24_2$ may be configured to transmit the second identifier $65_2$ to the electronic controller 22, such as via the first communication channel $64_1$. After a third period of time $68_3$, the third removable component $24_3$ may be configured to transmit the third identifier $65_3$ to the electronic controller 22, such as via the first communication channel $64_1$. For example and without limitation, the first communication channel $64_1$ may be used exclusively for the transmission of the identifiers 65 from one or more removable components 24 to an electronic controller 22, which may facilitate avoiding conflicts and/or ensuring that the identifiers 65 are properly transmitted to and received by the electronic controller 22. In other configurations, the first communication channel $64_1$ may be utilized for other communications, such as asynchronous communications.

In some instances, for example and without limitation, the first period of time $68_1$, the second period of time $68_2$, and/or the third period of time $68_3$ may be different from each other and/or may be unique, at least to some degree. With some configurations, the periods of time 68 may include random times that are different. The starts of the first period of time $68_1$, the second period of time $68_2$, and/or the third period of time $68_3$ may be triggered by an activation event 66. In some examples, as the periods of time 68 may include random times and/or may be different, a transmission collision may be avoided when removable components 24 are establishing communication with an electronic controller 22 via the first communication channel $64_1$ (e.g., so identifiers $65_{1-3}$ do not overlap, such as in the example shown in FIG. 6).

With embodiments, an electronic controller 22 may be configured to establish one or more communication slots 74 for some or all of the removeable components 24 of a system 20. In some instances, the electronic controller 22 may assign the slots 74 according to the order in which the electronic controller 22 receives identifiers 65 from the one or more removeable components 24. In some examples, the first identifier 65 received by the electronic controller 22 may be assigned a first communication slot $74_1$, the second identifier 65 received by the electronic controller 22 may be assigned a second communication slot $74_2$, the third identifier 65 received by the electronic controller 22 may be assigned a third communication slot $74_3$. In some instances, a communication slot 74 may be established when an electronic controller 22 sends a confirmation 70 via a second communication channel $64_2$ to a respective removable component 24, and/or the confirmation 70 is received by the respective removable component 24.

In embodiments, after an electronic controller 22 establishes respective communication slots 74 with the removeable components 24, the electronic controller 22 may be configured to transmit an information request 76 to the removeable components 24, such as via the second communication channel $64_2$ and/or a third communication channel $64_3$. In some examples, after the information request 76 is received by the removeable components 24, some or each of the removeable components 24 may send information 72 (e.g., location and/or orientation relative to a mounting surface 30/vehicle 26, occupancy status, power level, operational status, and/or error messages, among others) to the electronic controller 22 via a first communication channel $64_1$, a second communication channel $64_2$, and/or a third communication channel $64_3$. For example, the removable component 24 assigned to the first slot $74_1$ (e.g., removable component $24_1$ in the embodiment of FIG. 6) may transmit its information 72 via the first slot $74_1$, the removable component 24 assigned to the second slot $74_2$ (e.g., removable component $24_3$ in the embodiment of FIG. 6) may transmit its information 72 via the second slot $74_2$, and/or the removable component 24 assigned to the third slot $74_3$ (e.g., removable component $24_2$ in the embodiment of FIG. 6) may transmit its information 72 via the third slot $74_3$.

In embodiments, a communication slot 74 may include a time slot for a removable component 24 to transmit information (e.g., via the second channel $64_2$), such as in response to a request 76 from the electronic controller 22. For example, the time slots may be sequential time slots during which each assigned removable component 24 may transmit its information. Assigning communication slots 74 may facilitate avoiding conflicts on the second channel $64_2$ of removable component information (e.g., by avoiding removable components 24 transmitting at the same time on the same channel) and/or may allow the electronic controller 22 to determine the source of the removable communication information even if the information does not include identifying information. The electronic controller 22 may dynamically assign communication slots 74 such that the same removable component 24 could, at least in some circumstances, be assigned to different communication slots 74 for a first activation event 66 and a second activation event 66 (e.g., if other removable components 24 are connected that have a shorter period 68 are connected, if removable components 24 that have a shorter period 68 are removed/disconnected, etc.). Dynamically assigning communications slots 74 may reduce communication latency as communication slots may only be assigned for removable components 24 actually present. For example, there may not be a set/static number of communication slots 74, so communications may not need to wait for empty communication slots 74.

In some instances, the electronic controller 22 may dynamically reconfigure communication slots 74, such as if one or more removable component 24 are removed. For a vehicle application example, the electronic controller 22 may eliminate the communication slot(s) 74 associated with the removed component(s) 24 and/or may shift any communication slots after the eliminated slot back, which may reduce a total communication slot time allocation and/or reduce latency (e.g., improve communication efficiency). In some embodiments, such as for vehicle applications, an electronic controller 22 may reconfigure communication slots 74 without a vehicle power cycle or key-on type event. For example, the electronic controller 22 may detect the removal of a removable component 24 (e.g., via a mechanical sensor, a resistance sensor, a capacitance sensor, among others) and may automatically reconfigure communication slots following such removal.

With embodiments, such as generally illustrated in FIG. 7, an electronic controller 22 may be configured to store the identifiers 65 of previously connected/identified removable components 24 (e.g., removable components 24 that were connected for the most recent prior activation). For example and without limitation, the electronic controller 22 may be configured to store the first identifier $65_1$ of the first removable component $24_1$, the second identifier $65_2$ of the second removable component $24_2$, and/or the third identifier $65_3$ of the third removable component $24_3$. In some instances, for a subsequent activation event 66, the electronic controller 22 may be configured to determine which previously connected removable components 24 are still connected, if any, and/or which previously connected removable components 24 have been removed, if any. For example, the electronic controller 22 may automatically attempt to assign slots 74 to the removable components 24 that were most recently connected (e.g., during a rediscovery period). With the example of FIG. 7, the electronic controller 22 may automatically attempt to assign a first slot $74_1$ to a first removable component $24_1$ that was previously connected, but since the first removable component $24_1$ is no longer connected, the electronic controller 22 does not receive a confirmation 70, may determine that the first removable component $24_1$ is not present, and/or may move on to attempting to assign the first slot $74_1$ to the next removable component 24 that was previously connected (e.g., the second removable component $24_2$). Since the second removable component $24_2$ is still connected, the second removable component $24_2$ may send a confirmation 70 to confirm that it has been assigned to the first slot $74_1$. This process may continue for each of the removable components 24 connected for the most activation (e.g., prior to the instant/current activation event 66). In some instances, one or more electronic components 24 may include a rediscovery delay, which may correspond to the rediscovery period, prior to starting periods of time 68, which may allow the electronic controller 22 to complete a rediscovery process prior to removable components 24 transmitting identifiers 65. A rediscovery delay may, for example and without limitation, be about 200 ms.

In embodiments, after the electronic controller 22 has determined which of the previously connected removable components 24 remain in the vehicle 26, any newly added removable components 24, such as a fourth removable component $24_4$, may be configured to transmit a fourth identifier $65_4$ to the electronic controller 22. However, in some circumstances, new removable components 24, such as the fourth removable component $24_4$, may transmit their respective identifiers 65 regardless of the progress of the electronic controller 22 in identifying prior removable components 24 as the identification of prior removable components 24 may be carried out via the second communication channel $64_2$ and the new removable components 24 may transmit their identifiers via the first communication channel $64_1$. After receipt of a new identifier 65, such as a fourth identifier $65_4$ after a fourth period $68_4$, by the electronic controller 22, the electronic controller 22 may be configured to transmit a confirmation 70 to the new removable component 24, such as the fourth removable component $24_4$. In some examples, receipt of the confirmation 70 by the fourth removable component $24_4$ may establish a respective communication slot 74 between the fourth removable component $24_4$ and the electronic controller 22.

Figure 8:
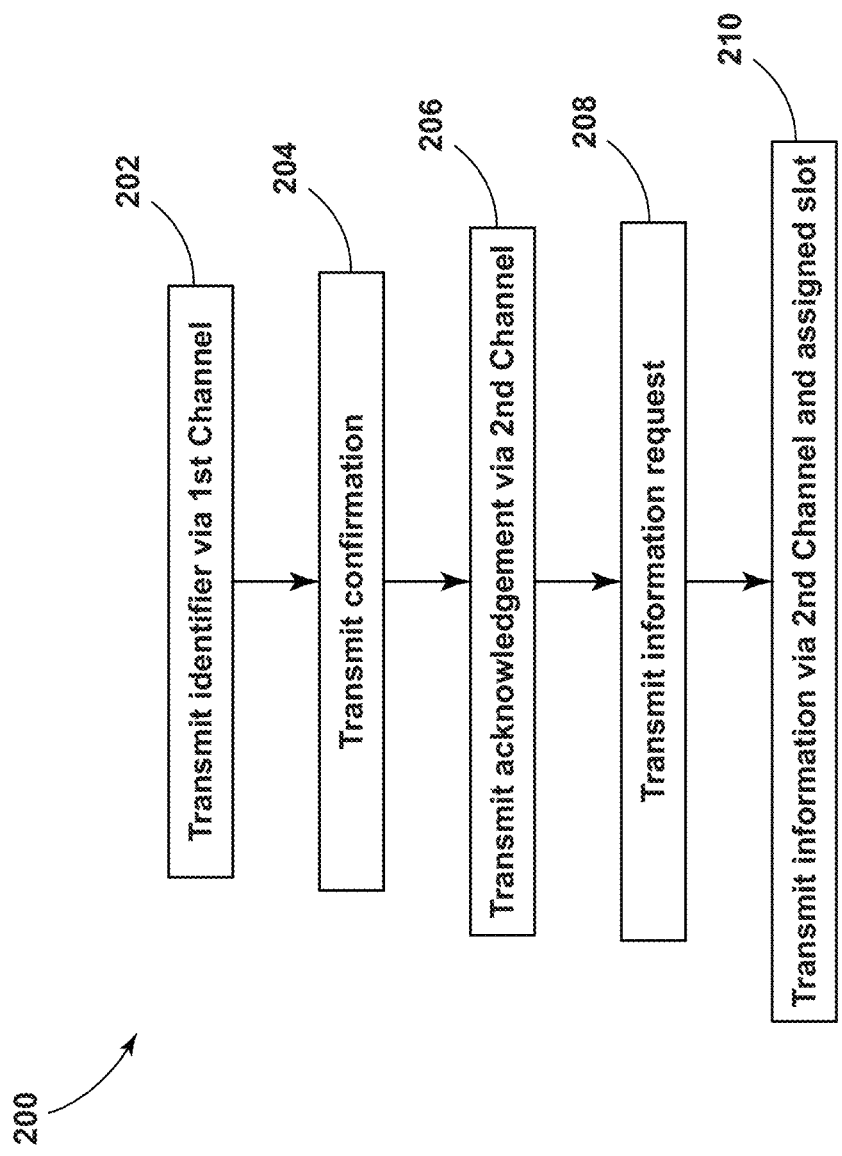
FIG. 8 is a flow diagram generally illustrating an embodiment of a method of operating a system for communicating with removable components according to teaching of the present disclosure.

In embodiments, such as generally illustrated in FIG. 8, a method 200 of operating a system 20 for communication with removable components 24 may include transmitting, by a removable component 24, an identifier 65 to an electronic controller 22, such as via a first communication channel $64_1$ (block 202), transmitting, by the electronic controller 22, a confirmation 70, which may include a communication slot assignment, to the removable component 24 via a second communication channel $64_2$ and/or a third communication channel $64_3$ (block 204), transmitting, by the removable component 24 an acknowledgement 71 to the electronic controller 22 (block 206), transmitting, by the electronic controller 22, a request for removable component information 76 (block 208), and/or transmitting, by the removable component 24, information 72 via the first communication channel $64_1$ and/or the second communication channel $64_2$, after receipt of the confirmation 70 (block 210).

In embodiments, an electronic controller (e.g., electronic controller 22, component controllers 25) may include an electronic controller and/or include an electronic processor, such as a programmable microprocessor and/or microcontroller. In embodiments, an electronic controller may include, for example, an application specific integrated circuit (ASIC). An electronic controller may include a central processing unit (CPU), a memory (e.g., a non-transitory computer-readable storage medium), and/or an input/output (I/O) interface. An electronic controller may be configured to perform various functions, including those described in greater detail herein, with appropriate programming instructions and/or code embodied in software, hardware, and/or other medium. In embodiments, an electronic controller may include a plurality of controllers. In embodiments, an electronic controller may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." and "such as" in the specification are to be construed broadly and they are used to provide non-limiting examples of embodiments of the disclosure, and the disclosure is not limited to such examples or such types of examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that an electronic controller (e.g., electronic controller 22, component controller 25), and/or a system as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A system for communicating with removable components, the system comprising:
   an electronic controller; and
   a removable component including an identifier and configured to (i) be disposed at different locations relative to a mounting surface of a vehicle and (ii) communicate with the electronic controller;
   wherein the removable component is configured to transmit the identifier to the electronic controller via a first communication channel;
   wherein the electronic controller is configured to transmit a confirmation to the removable component after receipt of the identifier;
   wherein the removable component is configured to transmit information to the electronic controller via at least one of the first communication channel and a second communication channel after receipt of the confirmation; and
   wherein the removable component is configured for selective connection with, movement along and relative to, and removal from one or more track assemblies connected with said mounting surface.

2. The system of claim 1, wherein the electronic controller is configured to transmit the confirmation to the removable component via the second communication channel and/or a third communication channel;
   the first communication channel is asynchronous; and
   the second communication channel utilizes a synchronous protocol.

3. The system of claim 1, including a second removable component having a second identifier.

4. The system of claim 3, wherein the removable component is configured to transmit the identifier to the electronic controller after a first period of time;
   the second removable component is configured to transmit the second identifier to the electronic controller after a second period of time; and
   the first period of time is different than the second period of time.

5. The system of claim 3, wherein each of the removable component and the second removable component includes a respective location sensor.

6. The system of claim 5, wherein the information includes a location of the removable component determined, at least in part, via the location sensor of the removable component.

7. The system of claim 4, wherein the first period of time includes a first random time and the second period of time includes a second random time.

8. The system of claim 4, wherein an activation event starts the first period of time and the second period of time.

9. The system of claim 8, wherein the electronic controller is configured to dynamically establish (i) a first communication slot for one of the removable component and the second removable component, based on which, between the identifier and the second identifier, is received first by the electronic controller, and (ii) a second communication slot with the other one of the removable component and the second removable component.

10. A vehicle including the system of claim 8, wherein the activation event includes a status change of the vehicle, a status change of the removable component and/or the second removable component, and/or a status change of the electronic controller.

11. The system of claim 1, wherein the first communication channel is associated with a first communication medium, and the second communication channel is associated with a second communication medium having a different characteristic than the first communication medium.

12. The system of claim 3, wherein the removable component and the second removable component and include vehicle seats; and
   the removable component and the second removable component are configured for electrical connection with said one or more track assemblies.

13. A method of operating the system of claim 3, the method comprising:

transmitting, by the removable component, the identifier to the electronic controller via the first communication channel;

transmitting, by the electronic controller, the confirmation to the removable component via the second communication channel, after receipt of the identifier; and transmitting, by the removable component, the information via the second communication channel, after receipt of the confirmation.

14. The method of claim 13, further comprising:

transmitting, by the removable component, the identifier to the electronic controller after a first period of time; and transmitting, by the second removable component, the second identifier to the electronic controller after a second period of time.

15. The method of claim 14, including triggering starts of the first period of time and the second period of time according to an activation event.

16. The method of claim 15, wherein prior to the activation event, the removable component and the second removable component are detachably coupled to one or more track assemblies.

17. The method of claim 15, including:

establishing, by the electronic controller, a first communication slot with one of the removable component and the second removable component, based on which, between the identifier and the second identifier, is received first by the electronic controller; and establishing, by the electronic controller, a second communication slot with the other one of the removable component and the second removable component.

18. The method of claim 17, including:

transmitting, by the electronic controller, an information request of the removable component and the second removable component.

19. The method of claim 18, including:

transmitting, via the second communication channel, first information of the one of the removable component and the second removable component associated with the first communication slot; and transmitting, via the second communication channel, second information of the other one of the removable component and the second removable component associated with the second communication slot;

wherein the electronic controller dynamically establishes a plurality of communication slots, including the first communication slot and the second communication slot, to reduce latency.

20. The method of claim 13, including:

transmitting, by a third removable component, a third identifier to the electronic controller via the first communication channel; and transmitting, by the electronic controller, an additional confirmation to the third removable component via the second communication channel.

* * * * *